(12) United States Patent
Suita

(10) Patent No.: US 6,195,704 B1
(45) Date of Patent: Feb. 27, 2001

(54) METHODS AND SYSTEMS FOR A LOOP-TYPE NETWORK USING A SPARE COMMUNICATIONS PATH

(75) Inventor: Daisuke Suita, Hino (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/101,472

(22) PCT Filed: Nov. 12, 1997

(86) PCT No.: PCT/JP97/04122

§ 371 Date: Jul. 10, 1998

§ 102(e) Date: Jul. 10, 1998

(87) PCT Pub. No.: WO98/21855

PCT Pub. Date: May 22, 1998

(30) Foreign Application Priority Data

Nov. 12, 1996 (JP) .................................. 8-300442

(51) Int. Cl.[7] ................................................. G06F 15/173
(52) U.S. Cl. ........................................... 709/239; 709/225
(58) Field of Search .................................. 709/239, 225, 709/226, 240, 242

(56) References Cited

U.S. PATENT DOCUMENTS

| | | | |
|---|---|---|---|
| 4,769,807 | * | 9/1988 | Niwa et al. ............................ 370/16 |
| 5,265,088 | * | 11/1993 | Takigawa et al. ...................... 370/15 |
| 5,278,824 | * | 1/1994 | Kremer ................................. 370/15 |
| 5,710,760 | * | 1/1998 | Moll .................................... 370/249 |
| 5,712,847 | * | 1/1998 | Hata .................................... 370/228 |
| 5,793,746 | * | 8/1998 | Gerstel et al. ........................ 370/228 |
| 5,870,382 | * | 2/1999 | Tounai et al. ......................... 370/220 |

FOREIGN PATENT DOCUMENTS

| | | |
|---|---|---|
| 4-84535 | 3/1992 | (JP) . |
| 4-100343 | 4/1992 | (JP) . |
| 4-172035 | 6/1992 | (JP) . |
| 5-63601 | 3/1993 | (JP) . |
| 5-191425 | 7/1993 | (JP) . |
| 5-268234 | 10/1993 | (JP) . |
| 5-316132 | 11/1993 | (JP) . |
| 6-164615 | 6/1994 | (JP) . |
| 7-66821 | 3/1995 | (JP) . |
| 7-123109 | 5/1995 | (JP) . |
| 2649441 | 5/1997 | (JP) . |
| 97/01907 | 1/1997 | (WO) . |

OTHER PUBLICATIONS

Yoshio Kajiyama et al., "An ATM VP–Based Self–Healing Ring," IEEE Journal of Selected Areas in Communications, vol. 12, No. 1, Jan. 1994, pp. 171–178.

Hideo Tatsuno and Nobuyuki Tokura, "Hitless Path Protection Switching Techniques for ATM Networks," The Transactions of the IEICE, vol. J76–B–I, No. 6, Jun. 1993, pp. 421–430.

Masahiro Takatori et al., "A High Performance Switch for OC–12 SONET Self–Healing Ring Networks," IEEE Journal of Selected Areas in Communications, vol. 14, No. 2, Feb. 1996, pp. 353–361.

* cited by examiner

*Primary Examiner*—Zarni Maung
(74) *Attorney, Agent, or Firm*—Finnegan, Henderson, Farabow, Garrett, Dunner, L.L.P.

(57) ABSTRACT

A network system which has an exact measure for solving a defect and therefore is very reliable and a method for setting a path thereof. With a plurality of node devices, each of which has a local communication device that is a source of data, an ATM-method loop-type network is built. In the case that a local communication device (21-1) and a local communication device (21-2) transmit data interactively, a communication path (41) for transmitting data and a communication path (42) for receiving data are formed by separate paths at both sides of a loop, and a spare communication path (43) is formed in the reverse direction, When any fault occurs on the transmission path, a loopback is conducted between the node devices which are adjacent to the fault point using the spare communication path to recover the communication path.

6 Claims, 11 Drawing Sheets

METHODS AND SYSTEMS FOR A LOOP-TYPE NETWORK USING A SPARE COMMUNICATIONS PATH

TECHNICAL FIELD

The present invention relates to a loop-type network system in which node devices are arranged in a loop, and to a method of controlling communication path thereof. In particular, it relates to a loop-type network system and controlling path thereof in which a data transmission path and a data reception path are separately established and a spare communication path is provided so as to make it possible to change paths immediately if a fault occurs, thus ensuring the availability of a communication path and improving the operability of the system.

BACKGROUND ART

As typical examples of conventional communications systems which have employed a loop-type network system in which node devices are arranged in a loop, the road control system, railway control system, sewerage control system, airport control system, river control system and underground railway control system have been known.

In these systems, a plurality of node devices are provided at each place and interconnected to each other. Data is transferred to the node devices and each node device is controlled on the basis of the data received.

Take a road control system for example. In the road control system, a control centre is installed within each control area, and video cameras, emergency telephones, vehicle sensors and other apparatus used in road surveillance are located along the roads. Information obtained from these apparatus is gathered on the control centre, where it is displayed on surveillance monitors.

Meanwhile, electronic signboards are also installed along the roads in order to display various road information, and communication routes are established for the purpose of transmitting the information (data) obtained by the aforementioned apparatuses to the display devices.

The control centre also gathers information on accidents and traffic congestion from adjoining areas, and various judgments are made on the basis of the gathered information and information from the area itself. The results are displayed on the electronic signboards in the form of information on traffic congestion and various other types of guidance, thus helping to control the traffic.

FIG. 9 illustrates a road control system of this kind. The system comprises a plurality of node devices 10-1 through 10-8, and a communication route 40 which connects the node devices 19-1 through 10-8 so as to transmit and receive information therebetween.

Specifically, in FIG. 9, 10-1 is a control centre or a node device located in the control centre or each place, while 20-1 through 20-8 are local communication devices such as video cameras, emergency telephones, vehicle sensors, electronic signboards or monitors. 30 is a communication path control device (console), which controls the communication path in relation to the node devices 10-1 through 10-8.

In the system configured in this manner, the communication paths in relation to the node devices 10-1 through 10-8 are established through the control by the communication path control device 30. Meanwhile, 40 is an optical cable which constitutes the communication path, assuming the form of a loop which serves to transmit data between the local transmission devices by way of the plurality of node devices 19-1 through 10-8.

Recent years have witnessed the development of transmission systems of this sort which make use of the ATM (asynchronous transfer mode) exchange method and in which the communication path is established in the ATM exchange method.

FIG. 10 is a simplified version of FIG. 9, and will be used for the purpose of describing a path control system using the ATM exchange method.

In the conventional system configured as illustrated in FIG. 10, the communication path through which data (e.g., to display on a surveillance monitor screen images of traffic congestion picked up by a video camera) is transmitted between local communication devices 21-1 and 21-2 is connected at the node devices 15, 16, 17 by way of a single route of a bidirectional path with data transmission and data reception using the same VPI/VCI (virtual path/virtual channel) data.

However, there is a problem in establishing communication paths in a loop-type network as described above in that it is difficult to operate the communication paths if a system fault occurs.

For instance, as shown in FIG. 11, if a fault occurs in one of the node devices or in the optical cable which connects the node devices, the whole of the communication route associated with the faulty section is blocked. As a result, data transmission becomes impossible and the system ceases to operate. Thus, the occurrence of a fault on the communication route which forms the loop in a loop-type network is fatal for the operation of the system.

Moreover, when a diversion path is to be established onto a route which is unaffected by the fault, it is necessary to re-establish the communication paths to all the node devices, and after the fault has been repaired and service resumed, the communication paths to all the node devices must be checked. This means that the system will be inoperative for a long time, leading to a lowering of the control function. In the road control system designed to work night and day, this long inoperative time of the system will create severe disruption and cause panic in traffic.

As described above, the conventional network path establishing method is configured based on a path control method in which the communication path between local communication devices runs round the loop in such a manner that the transmission and reception paths follow the same route. With such a configuration, the occurrence of a fault will make data transmission impossible, and depending on the spot where fault occurs, it may be necessary to re-establish diversion routes for all the communication paths connected with that spot. In a system such as the road control system where transmission defaults at the outdoor location may occur at high probability, the communication path has to be disrupted in a long time at any times, and a great deal of work is required in order to re-establish a diversion route.

DISCLOSURE OF THE INVENTION

It is an object of the present invention to provide a loop-type network system and a method of path control for the network system, which make it possible to change route immediately if a fault occurs, thus ensuring the availability of a communication path and improving the operability of the system.

With a view to achieving the abovementioned object, the present invention provides a loop-type network system in which a plurality of node devices housing terminals are provided and communication paths between the terminals are established by the node devices so as to realise bidirectional communication between the terminals, the network system including a communication path control device for controlling the connection of the communication paths to the node devices, which is characterised in that a communication path between the terminals is established by establishing a transmission path and a reception path in separate routes, while establishing a loop-shaped spare communication path in a direction opposite to a direction of a loop route formed by the transmission path and the reception path.

The node devices may employ the asynchronous transfer mode exchange method.

The spare communication path may utilise the same virtual path and virtual channel as in the transmission path and the reception path established by the separate routes.

Further, the present invention provides a method of path control in a loop-type network system in which a plurality of node devices housing terminals are provided and communication paths between the terminals are established by the node devices so as to realise bidirectional communication between the terminals, the network system including a communication path control device for controlling the connection of the communication paths to the node devices, which is characterised in that the method comprises the steps of establishing a communication path between the terminals by establishing a transmission path and a reception path in separate routes, while establishing a loop-shaped spare communication path in a direction opposite to a direction of a loop route formed by the transmission path and the reception path; and when a fault occurs in a node device or in a communication route interconnecting the node devices, conducting a loopback by using the spare communication path at the node device in which the fault has occurred or at node devices adjoining the communication route in which the fault has occurred.

In the above method, the node devices may employ the asynchronous transfer mode exchange method.

Further, the spare communication path may utilise the same virtual path and virtual channel as in the transmission path and the reception path established by the separate routes.

As seen the foregoing, according to the present invention, since a communication path between the local communication devices is established in different routes, it is possible prevent the risk of the communication path being completely severed when fault occurs. In addition, by utilising the same VPI/VCI to establish a spare communication path, the present invention ensures that the system will switch immediately to the diversion route, thus increasing its reliability.

BEST MODE FOR CARRYING OUT THE INVENTION

There follows a detailed description of an embodiment of the present invention with the aid of the drawings.

Figure 9:
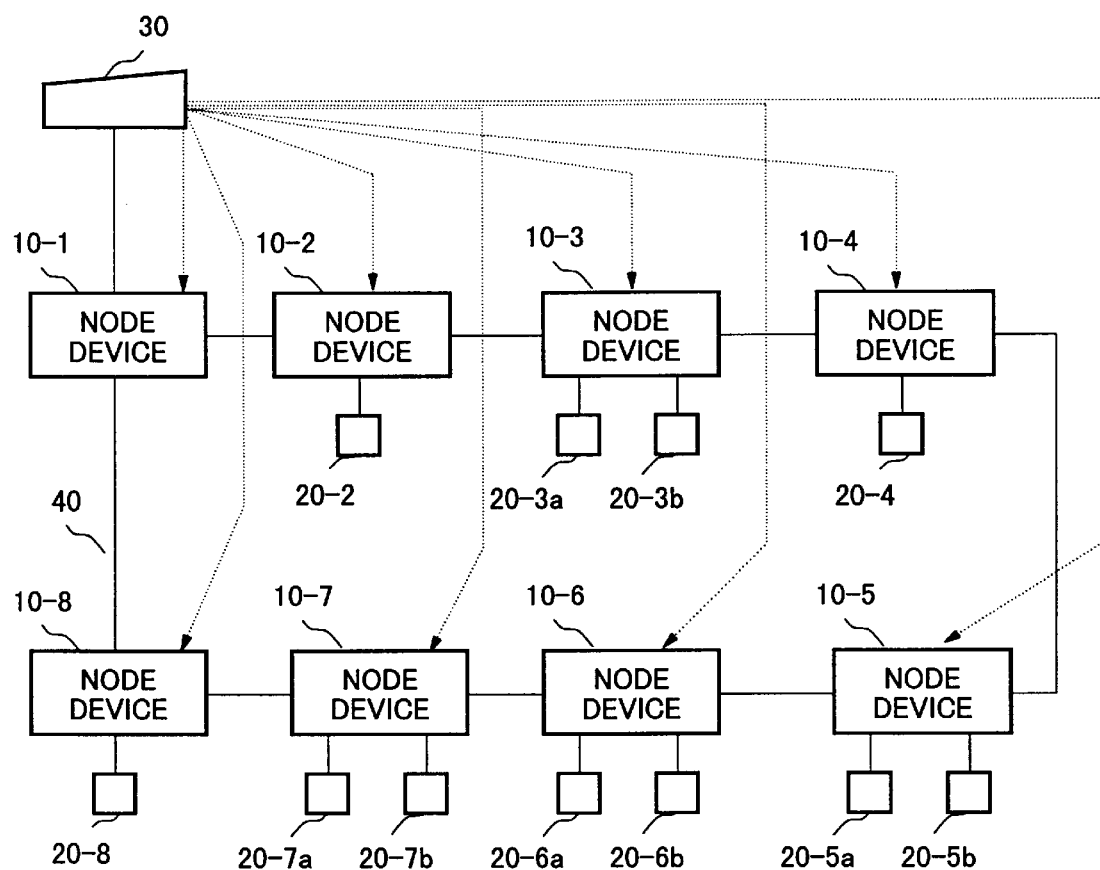
FIG. 9 is a block diagram illustrating the general configuration of a loop-type network system.
Figure 10:
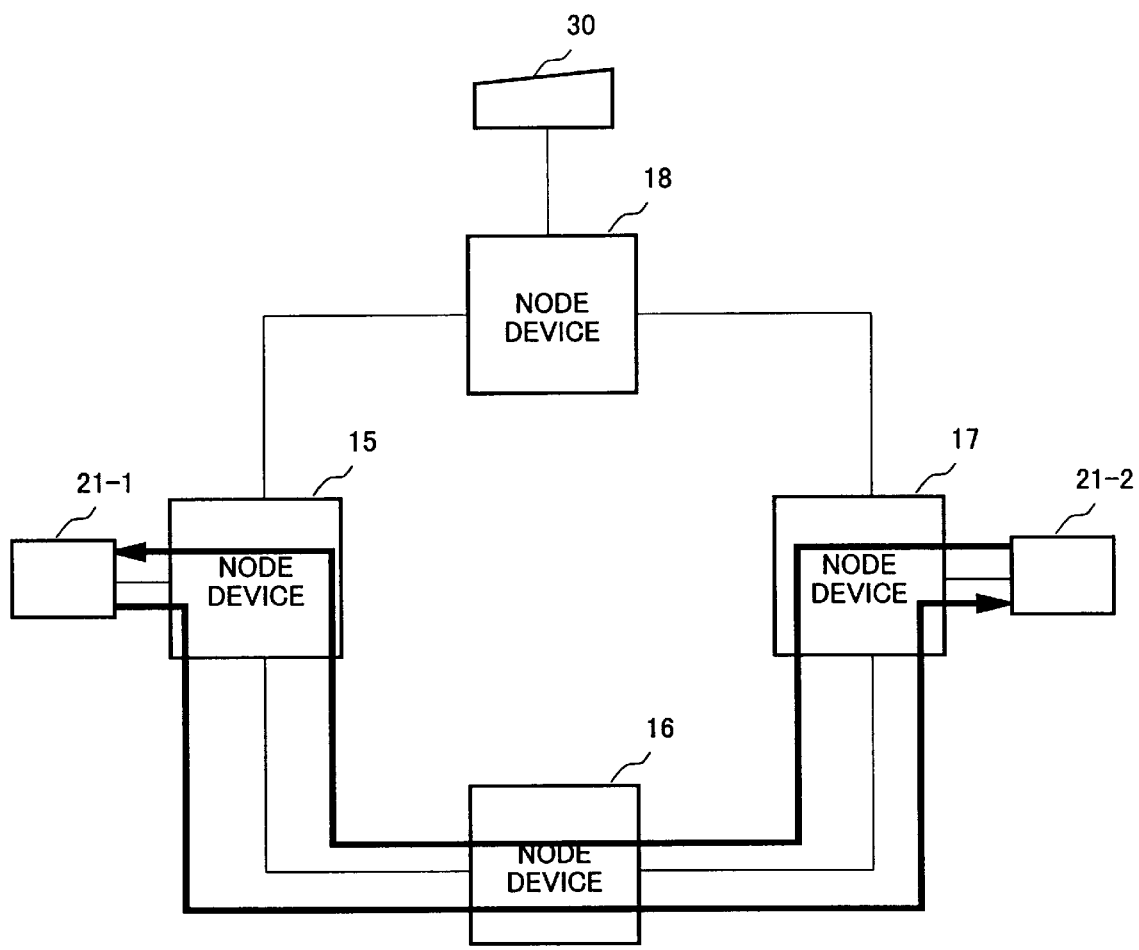
FIG. 10 is a block diagram illustrating an example of a conventional pass control method.
Figure 11:
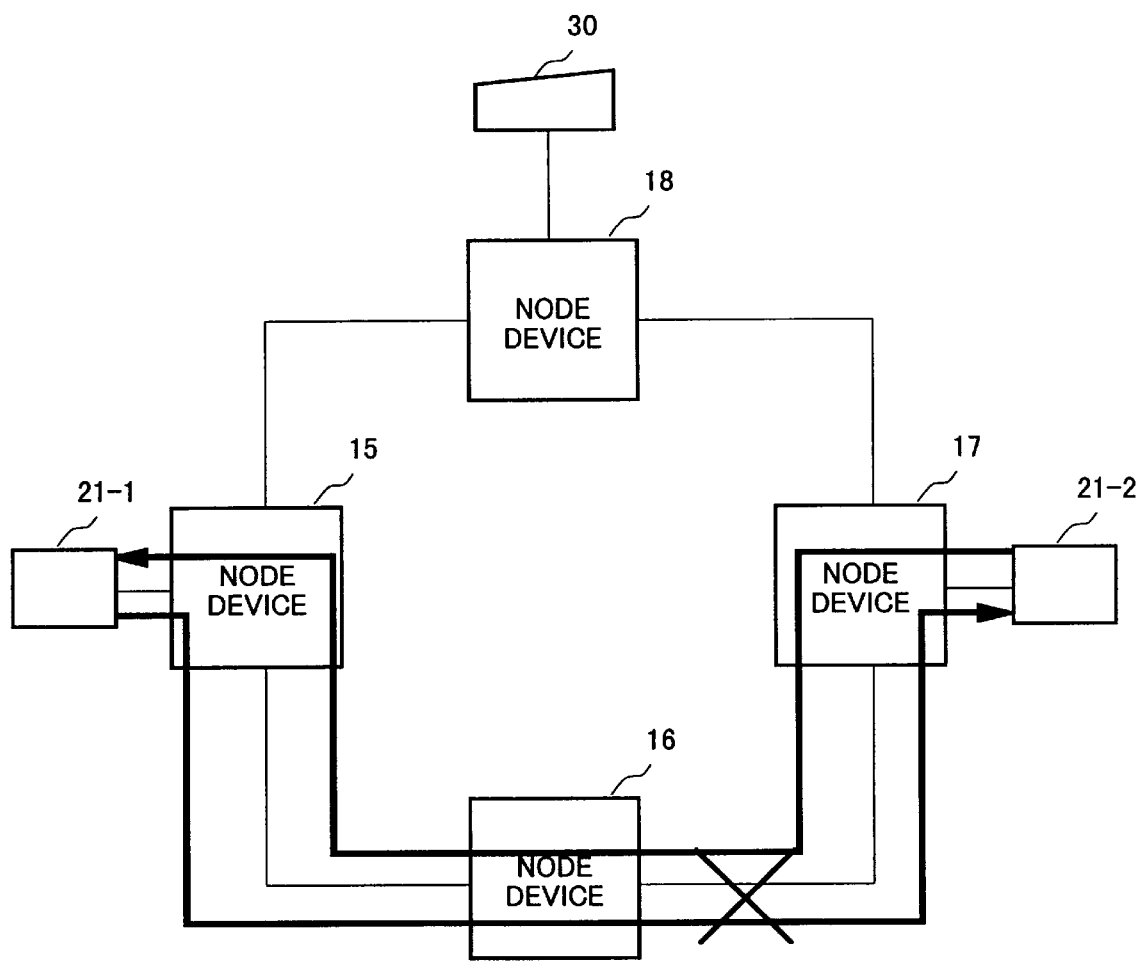
FIG. 11 is a block diagram illustrating the occurrence of a fault in a conventional pass control method.

The same system configuration may be utilised in this embodiment as is depicted in FIG. 9.

The actual flow in the communication paths in the system according to this embodiment will first be explained with reference to FIG. 1, which illustrates a simplified version of the system configuration depicted in FIG. 9.

Figure 1:
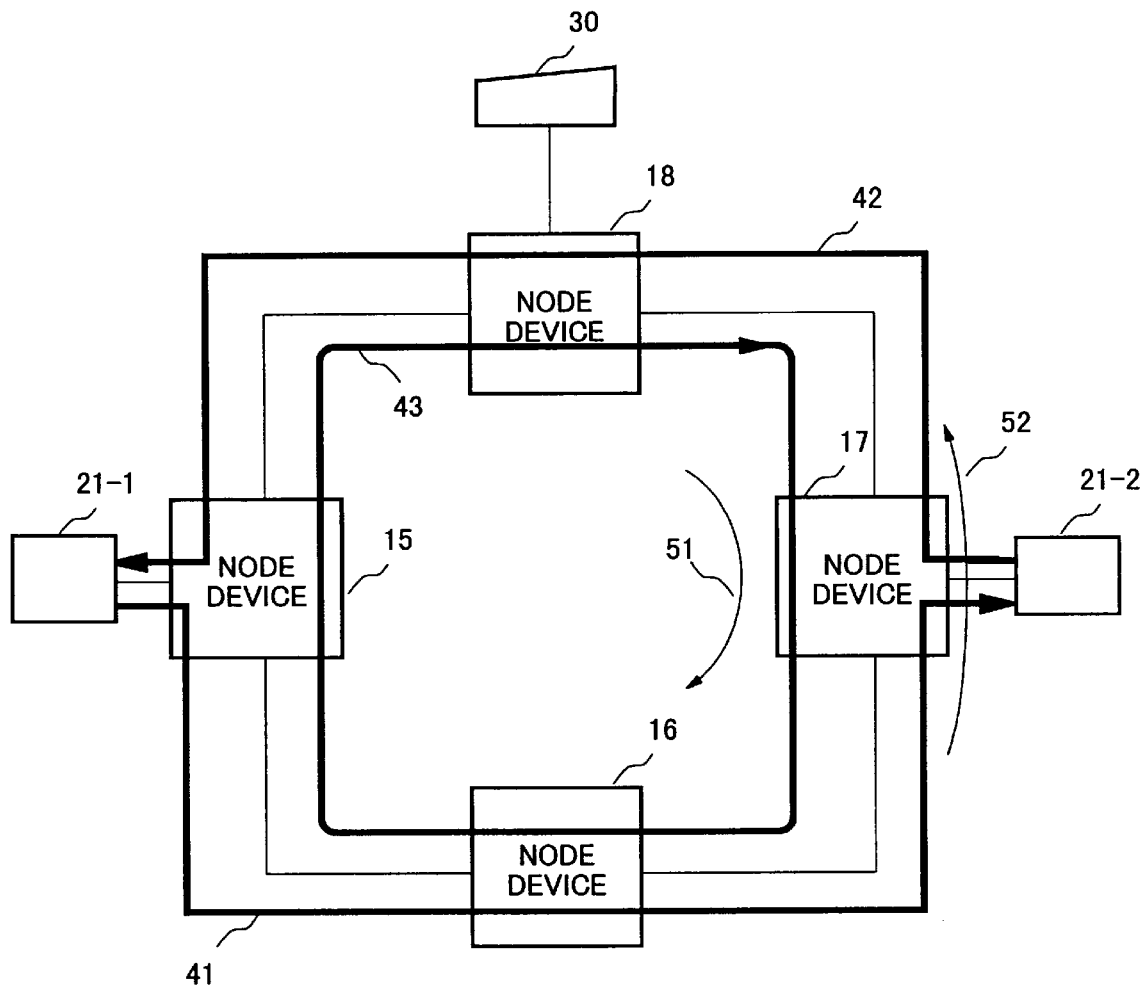
FIG. 1 is a block diagram illustrating an embodiment of the method of path control in a loop-type network system to which the present invention pertains.

FIG. 1 shows an example of a loop-type network comprising four node devices. When local communication devices 21-1, 21-2 communicate bidirectionally, three communication paths listed below are established for the transmission of data.

1) A first communication path (transmission path) 41 through which data transmitted from the local communication device 21-1 is relayed to the local communication device 21-2 by way of a node device 15, a node device 16 and a node device 17.

2) A second communication path (reception path) 42 through which data received by the local communication device 21-2 is relayed to the local communication device 21-1 by way of the node device 17, a node device 18 and the node device 15.

3) A third communication path (spare communication path) 43 which is established irrespective of normal transmission and reception in an opposite direction to the direction of the first communication path 41 and second communication path 42 (transmission and reception paths).

The "opposite direction" in relation to the spare communication path 43 means that the spare communication path 43 is established in the direction depicted by an arrow 51 as opposed to the direction of the transmission and reception paths 41, 42 which is depicted by arrow 52.

Figure 2:
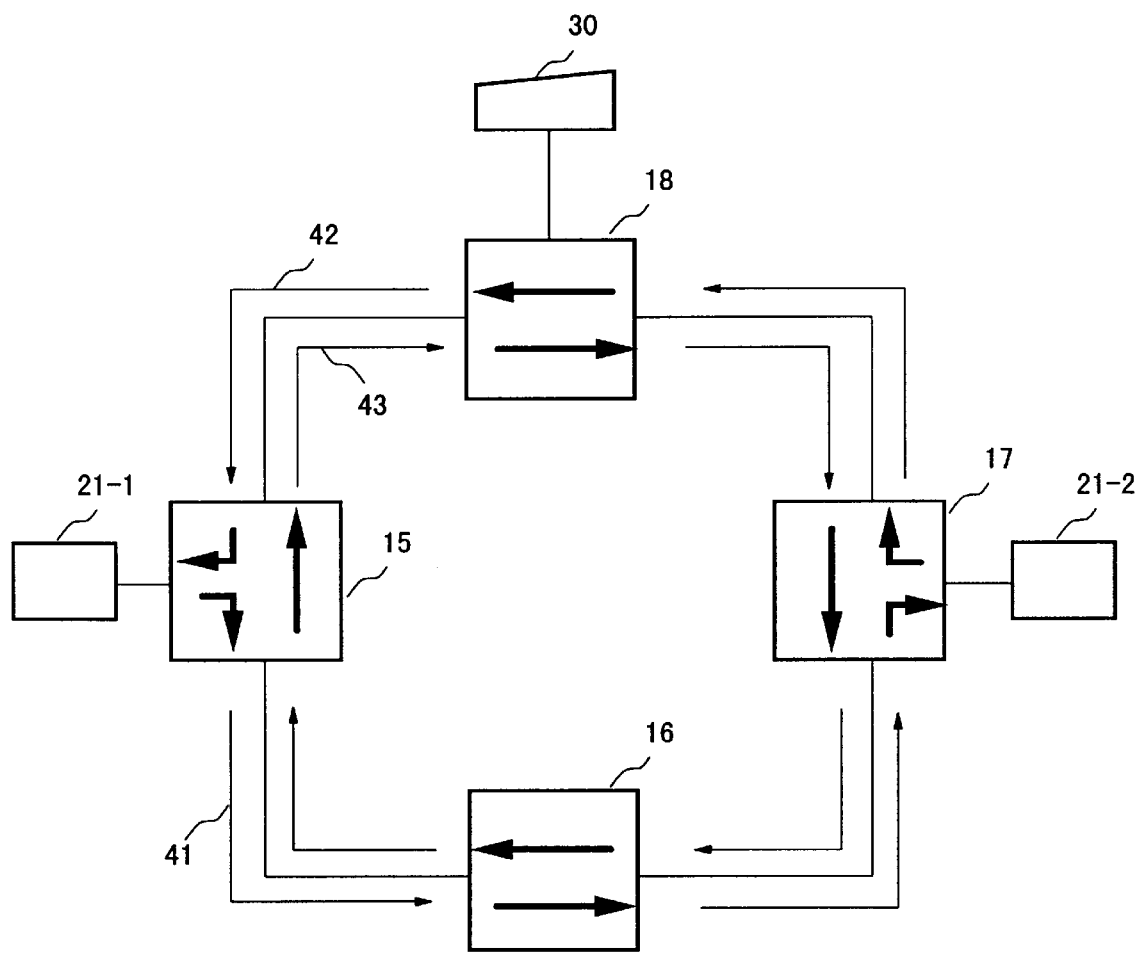
FIG. 2 is a block diagram illustrating an example of switching in the loop-type network system depicted in FIG. 1.

FIG. 2 illustrates how the node devices 15, 16, 17, 18 perform the switching operations in order to establish the communication paths depicted in FIG. 1.

For example, the node device 15 performs three switching operations for the paths including the spare communication path 43, and the node device 16 performs two switching operations; namely, in the transmission direction from the local communication device 21-1 to the local communication device 21-2 for the communication path 41 and in the opposite direction for the spare communication path 43, as the drawing shows.

The switching of communication paths including the spare communication path 43 is performed at the node devices 15, 16, 17, 18 under the control by a communication path control device 30 at the time of the establishment of communication paths between the local communication devices.

Figure 3:
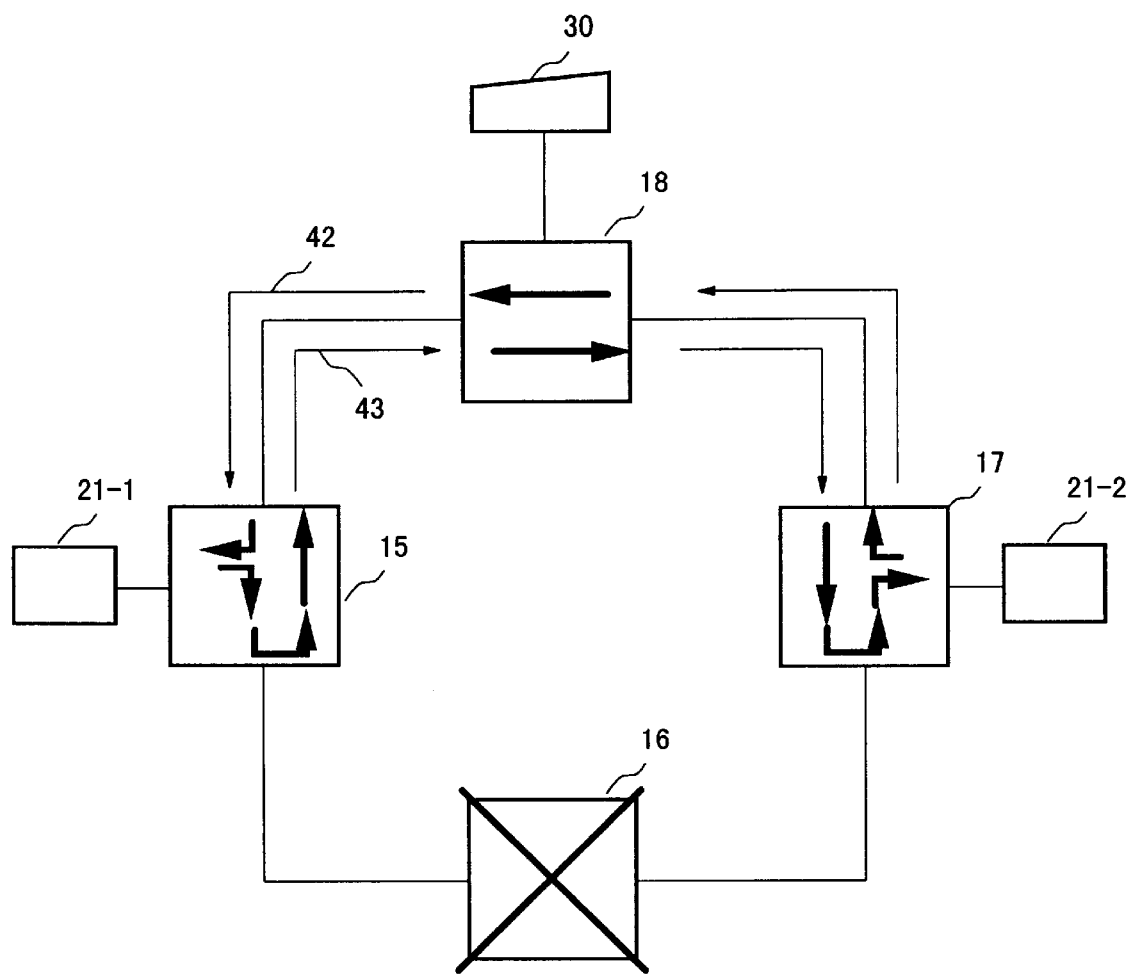
FIG. 3 is a block diagram illustrating loopback where a fault has occurred in one of the node devices.
Figure 4:
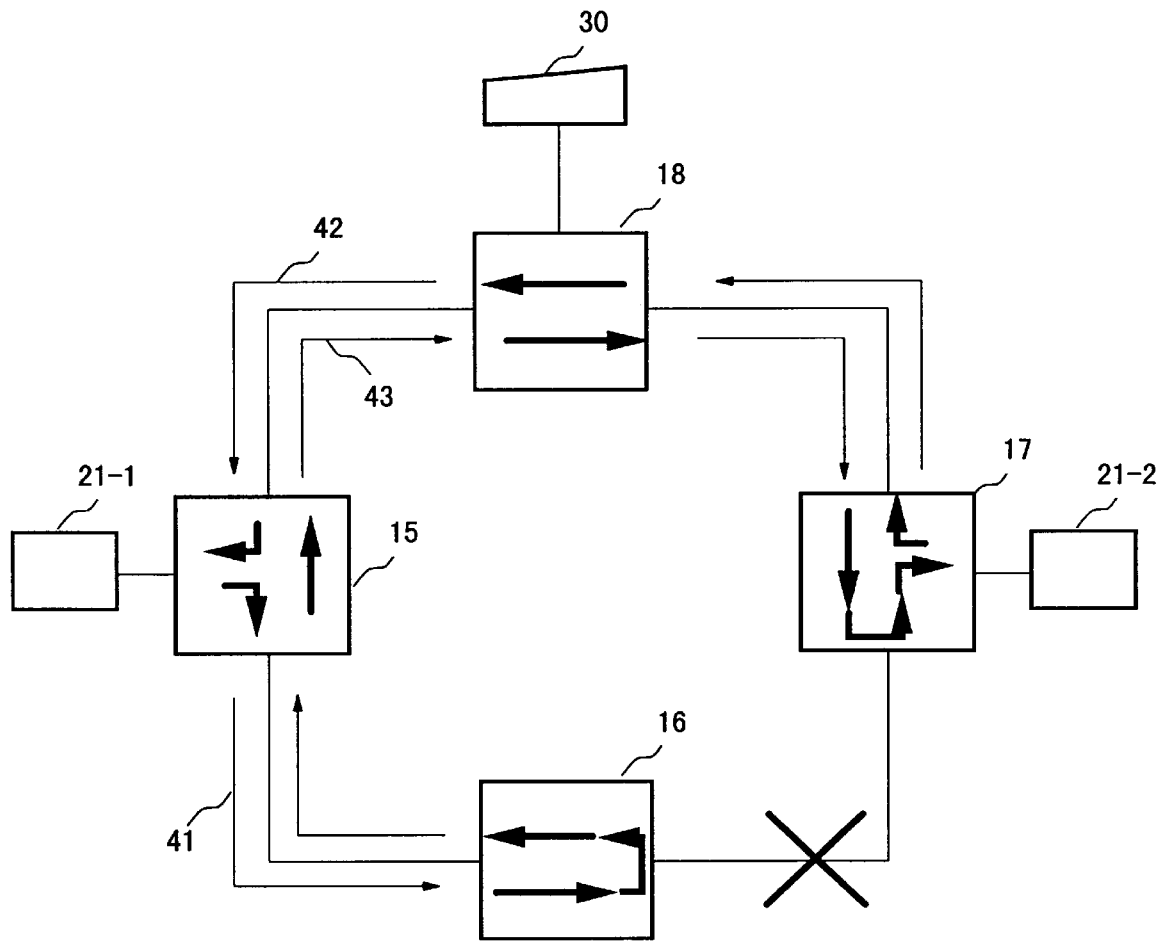
FIG. 4 is a block diagram illustrating loopback where a fault has occurred in the communication route.

Referring now to FIG. 3 and FIG. 4, description will be made in the event when a fault occurs in one of the node devices or at the optical cable which forms the communication route.

FIG. 3 shows that a fault has occurred in the node device 16 so that the transmission of data from the local communication device 21-1 to the local communication device 21-2 has become impossible.

In such an event, the communication path control device 30 controls the node device 15 and node device 17 which are located on both sides of the node device 16 so as to loopback the communication path to the direction of the node device 18 by utilising the spare communication path, thus allowing data transmitted from the local communication device 21-1 to be transmitted to the local communication device 21-2.

FIG. 4 shows an event in which a fault has occurred in the communication route 40 so that transmission of data from the local communication device 21-1 to the local communication device 21-2 becomes impossible.

In this event, the node devices on either side of the spot where the fault has occurred are the node device 16 and the node device 17. The node device 16 and the node device 17 utilise the spare communication path to conduct a loopback, thus allowing data transmitted from the local communication device 21-1 to be relayed to the local communication device 21-2.

Figure 5:
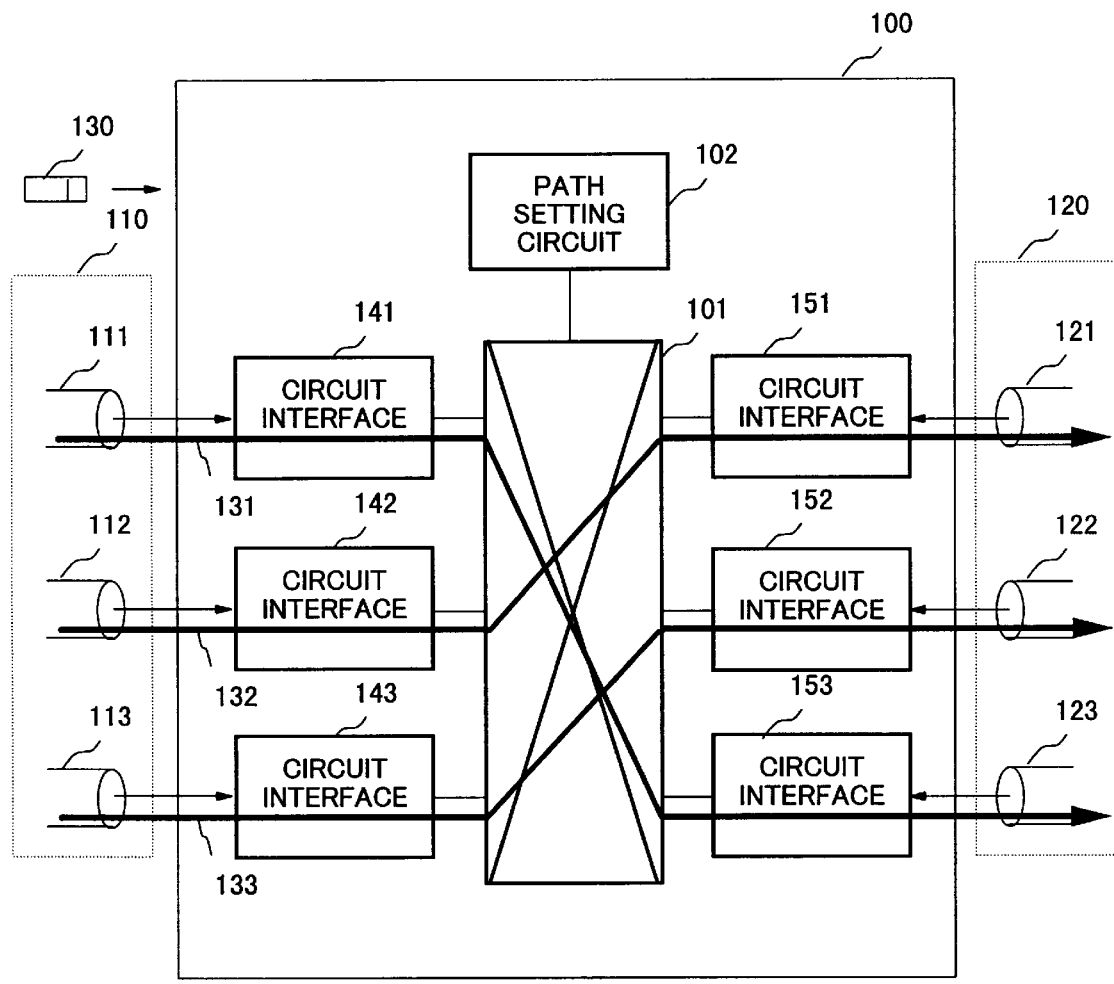
FIG. 5 is a block diagram illustrating communication path connection in the node device depicted in FIG. 1.

FIG. 5 is a block diagram illustrating a node device such as the node device 15 or 17 in FIG. 2, to which a local communication device is connected for transmitting and receiving data.

In the node device 100 illustrated in FIG. 5, 101 is an ATM switch. A path setting circuit 102 causes the ATM switch 100 to switch to establish a communication path on receipt of a request from the communication path control device 30.

Further, 110 is an input port to which data (cells) is input, 120 is an output port through which data switched by virtue of the ATM switch 101 is output, 111 and 121 are first input/output ports, 112 and 122 are second input/output ports, and 113 and 123 are third input/output ports.

Assuming that the node device 100 depicted in FIG. 5 is the node device 15 depicted in FIG. 2, then the first ports 111, 121 are connected to the local communication device 21-1, the second ports 112, 122 to the node device 18, and the third ports 113,123 to the node device 16.

A cell 130 is input through the input port 110 and by way of circuit interfaces 141, 142, 143, which have loopback function, to the ATM switch 101, where it is switched according to port number, VPI and VCI, and guided by way of circuit interfaces 151, 152, 153 to the output port 120.

Cells 131, 132, 133 which are input through the input ports 111, 112, 113 and output through the output ports 121, 122, 123 all have the same VPI and VCI, and only the ports are different.

Figure 6:
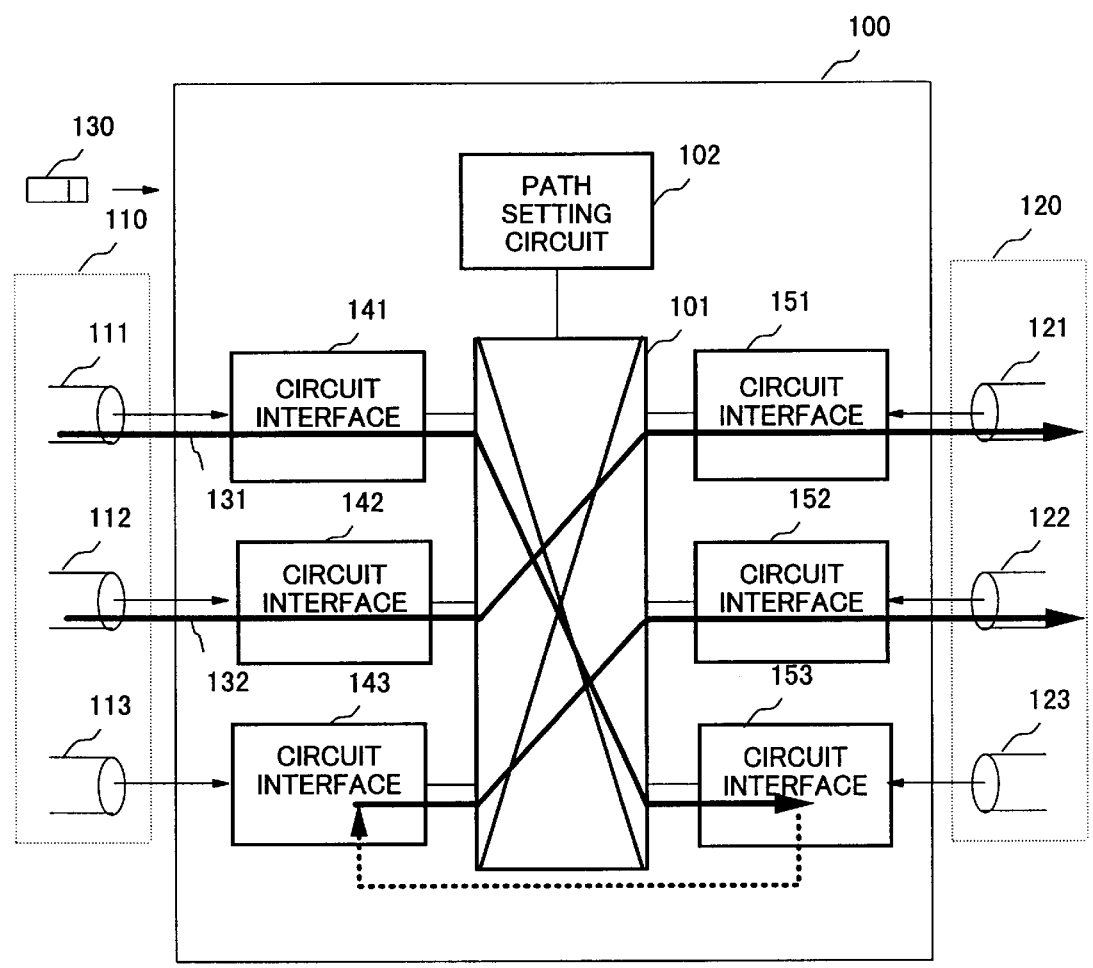
FIG. 6 is a block diagram illustrating communication path loopback in the node device depicted in FIG. 5.

FIG. 6 is a block diagram illustrating a communication path loopback in the node device 100 depicted in FIG. 5. Assuming that, as in FIG. 5, the node device 100 is the node device 15 depicted in FIG. 3, a cell input through the first port 111 is looped back by the circuit interfaces 143, 153 and output to the second port 122.

In this case, since the same VPI and VCI are used, it is possible to alter the route without any switching other than conducting the loopback at the circuit interfaces 143, 153.

Figure 7:
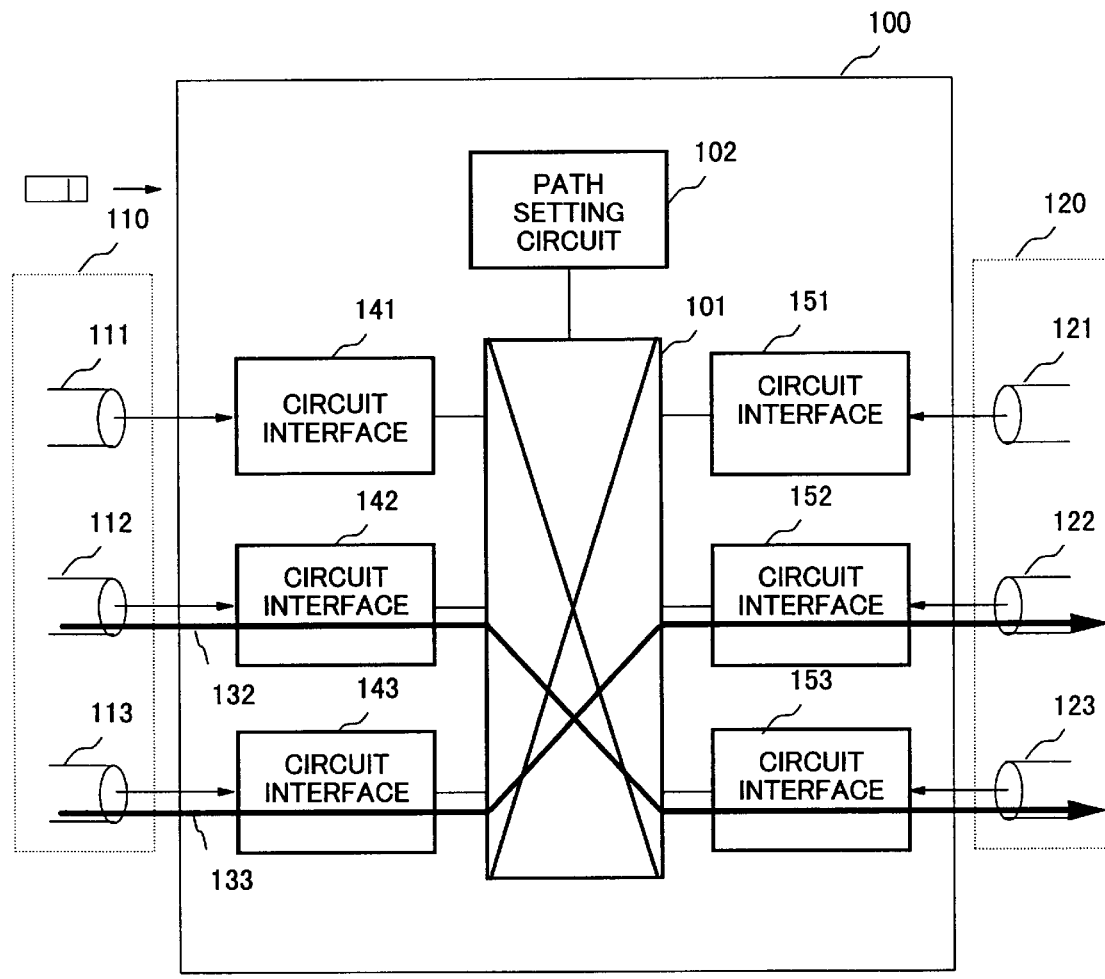
FIG. 7 is a block diagram illustrating communication path connection in the node device depicted in FIG. 1.

FIG. 7 is a block diagram illustrating a node device, such as the node device 16 or node device 18 depicted in FIG. 2, to which no local communication device for transmitting and receiving data is connected.

The configuration of the node device illustrated in FIG. 7 is the same as that illustrated in FIG. 5.

For example, assuming that the node device 100 depicted in FIG. 7 is the node device 16 depicted in FIG. 2, then the ports 112, 121 are connected to the node device 15 while the ports 113, 123 are connected to the node device 17.

In such a node device, cells 132, 133 input from the input port 110 are exchanged by virtue of the ATM switch 101 and guided to the output port 120.

Figure 8:
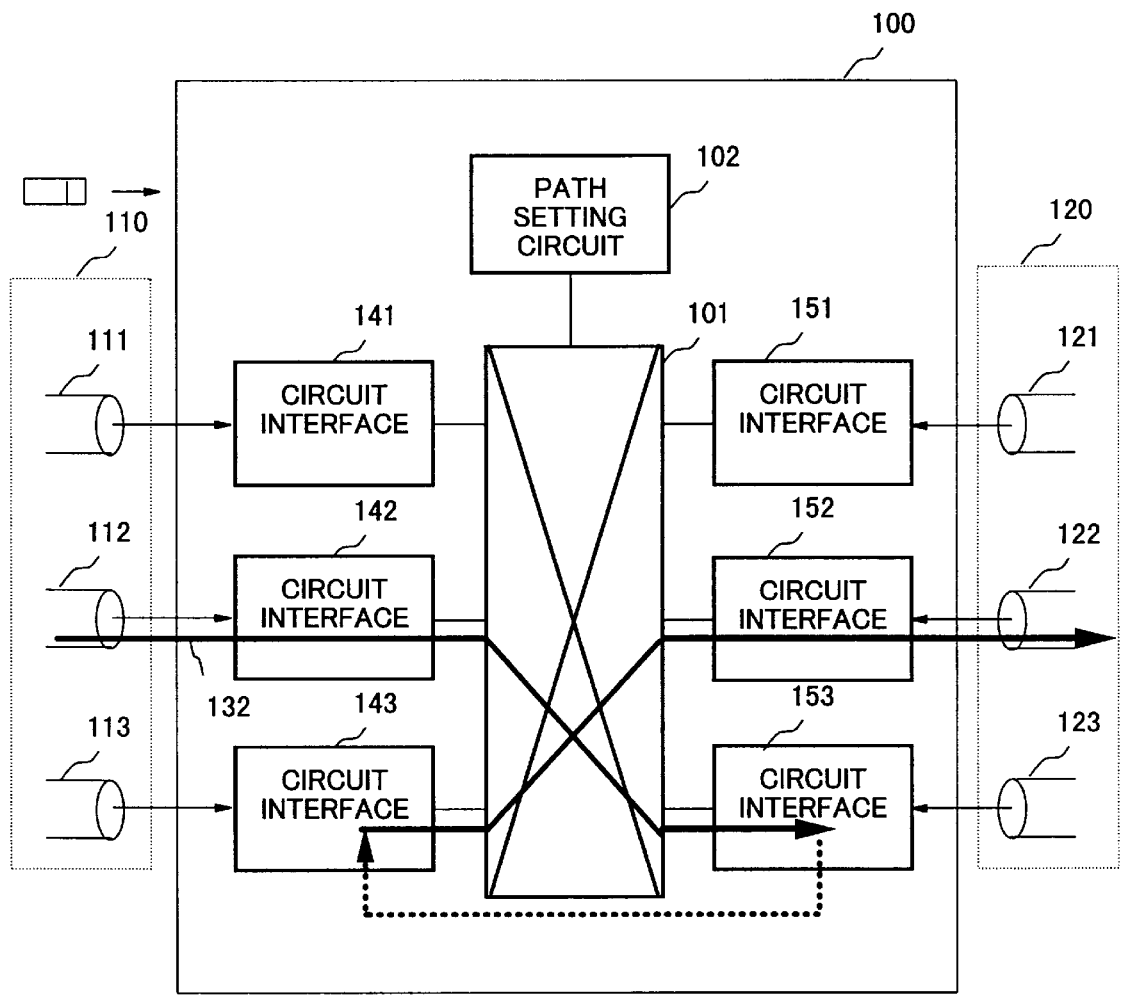
FIG. 8 is a block diagram illustrating communication path loopback in the node device depicted in FIG. 7.

FIG. 8 is a block diagram illustrating the node device 100 depicted in FIG. 7 in which a loopback is conducted. As in FIG. 5, it is assumed that the node device 100 is the node device 15 depicted in FIG. 3. Then, a cell input through the second port 112 is looped back at the circuit interfaces 143, 153 and output to the second port 122.

In this case, since the same VPI and VCI are used, it is possible to alter the route without any switching other than conducting the loopback at the circuit interfaces 143, 153, thereby enabling bidirectional communication between the local communication devices.

INDUSTRIAL APPLICABILITY

The present invention can be applied to a loop-type network system in which node devices are arranged in the form of a loop. The configuration is such that the data transmission path and data reception path follow different routes, and a spare communication path is provided in the opposite direction to that of the transmission and reception paths and using the same VPI/VCI so that when a fault occurs, the communication paths in the node devices on either side of the spot where the fault has occurred are made to be looped back, thus allowing the communication paths to be restored simply by establishing a loopback, and serving thereby to improve the operability of the system as a whole.

What is claimed is:

1. A loop-type network system, comprising:

a plurality of node devices each having a first plurality of circuit interfaces connected to at least three input ports, a second plurality of circuit interfaces connected to at least three output ports, an ATM switch for connecting the first and second circuit interfaces, and path establishing means for establishing a communication path through the ATM switch;

a communication route for connecting the plurality of node devices in a loop configuration; and a plurality of communication terminals connected to the plurality of node devices, wherein, a transmission path using a virtual channel identifier (VCI) and virtual path identifier (VPI) is established that connects at least two of the plurality of communications terminals via the communication route;

wherein a reception path using the same virtual channel identifier (VCI) and virtual path identifier (VPI) but a different route than the transmission path is established that connects the at least two communication terminals via the communication route; and wherein a spare communication path that connects the at least two communication terminals is established that uses the same virtual channel identifier (VCI) and virtual path identifier (VPI) as the transmission and reception paths but in an opposite direction than the transmission and reception paths.

2. The loop-type network system according to claim 1, wherein, when a fault occurs at a point in the communication route, a loop-back route is established between the first plurality of circuit interfaces and the second plurality of circuit interfaces in node devices located on each side of the point where the fault occurs so as to restore communication using the spare communication path.

3. A loop-type network system, comprising:

a plurality of node devices;

a communication route for connecting the plurality of node devices in a loop configuration;

a first communication terminal connected to one of the plurality of node devices;

a second communication terminal connected to one of the plurality of node devices;

a transmission path that uses the communication route and connects the first communication terminal and the second communication terminal;

a reception path that uses the communication route and connects the first communication terminal and the second communication terminal, wherein the transmission path and the reception path use the same virtual path identifier (VPI) and virtual channel identifier (VCI), and wherein the transmission path and the reception path use separate routes; and a spare communication path that uses the communication route and the same virtual channel identifier (VCI) and virtual path identifier (VPI) as the transmission and reception path, and wherein the spare communication path connects the plurality of nodes in the opposite direction of the transmission path and the reception path;

wherein each of the plurality of nodes includes loop-back route establishing means for establishing a loop-back route between either the transmission path or the reception path and the spare communication path.

4. The loop-type network system according to claim 3, wherein each of the plurality of node devices comprises:

at least three input ports;

a first plurality of circuit interfaces each connected to the input ports;

at least three output ports;

a second plurality of circuit interfaces each connected to the output ports;

an ATM switch for connecting the first plurality of circuit interfaces to the second plurality of circuit interfaces; and path establishing means for establishing a communication path through the ATM switch.

5. The loop-type network system according to claim 4, wherein, when a fault occurs at a point in the communication route, a loop-back route is established between the first circuit interface and the second circuit interface in node devices located on each side of the point where the fault occurs so as to restore communication using the spare communication path.

6. The loop-type network system according to claim 4, wherein, when a fault occurs at a point in the communication route, a loop-back route is established between the first plurality of circuit interfaces and the second plurality of circuit interfaces in node devices located on each side of the point where the fault occurs, and the communication path through the ATM switch is maintained.

* * * * *